July 5, 1932.  F. M. CLARK  1,866,346

DRYING TREATMENT

Filed March 5, 1929

Inventor:
Frank M. Clark,
by Charles E. Mullen
His Attorney.

Patented July 5, 1932

1,866,346

UNITED STATES PATENT OFFICE

FRANK M. CLARK, OF PITTSFIELD, MASSACHUSETTS, ASSIGNOR TO GENERAL ELECTRIC COMPANY, A CORPORATION OF NEW YORK

DRYING TREATMENT

Application filed March 5, 1929. Serial No. 344,569.

The present invention in its specific aspect comprises a method whereby closely bound moisture may be eliminated from electric condensers, transformers or other electrical devices. However, my invention is not limited in its scope of usefulness to electrical devices.

Condensers, and other electrical devices, when made under ordinary conditions, contain a harmful amount of moisture which is not removable by ordinary drying methods. Such devices, heretofore, have been subjected to a heat and vacuum treatment in order to remove moisture and thereafter have been impregnated in a vacuum with oil, varnish, or other insulating liquids. My investigations have shown that moisture is removed with difficulty when such devices are subjected only to vacuum treatment even when an elevated temperature is employed. The moisture remaining may seriously reduce the insulation value and life of the dielectric material which enters into the structure of such devices. This is particularly true of electric condensers containing paper or other cellulosic insulation, which retains moisture with the tenacity of chemical combination. It is the object of my invention to quickly remove this closely bound moisture, to avoid lengthly heat and vacuum application and thus to improve electrical or other devices treated by my improved procedure.

In accordance with my invention the article to be treated is subjected, preferably while heated, to the repeated applications of a gas, such as air or carbon dioxide, which is dry with respect to the article being treated, the respective applications of dry gas being followed by removal of a substantial part of said gas. For example, an electrical condenser is heated in an evacuated space to facilitate the elimination of moisture, and then a dry gas is admitted. When equilibrium conditions have been attained with respect to the moisture content of the gas and the condenser, the gas is removed in large part, and a fresh increment of dry gas is admitted, followed in turn by its removal. This admission and removal of gas is continued many times until the moisture content of the condenser has been reduced to a desired low value.

Figure 1:
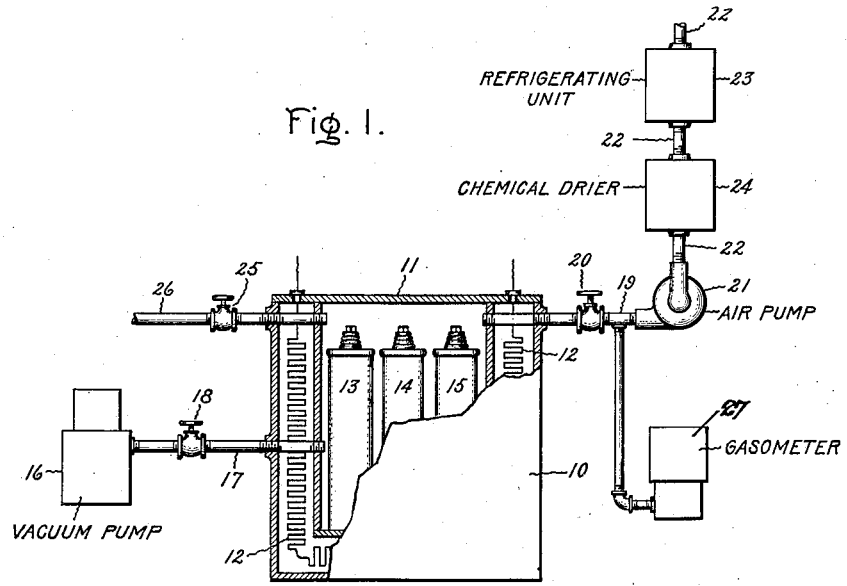
Figure 2:
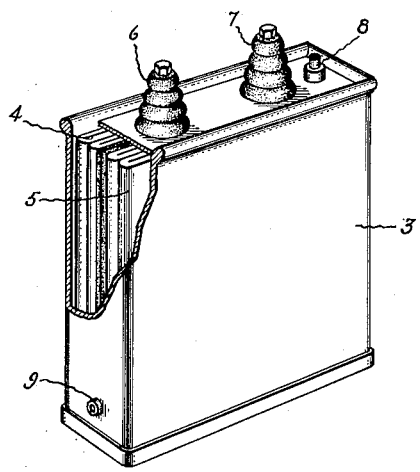

My invention will be described in greater detail in connection with the accompanying drawing in which Fig. 1 shows diagrammatically (not on a uniform scale), and partly in section, an apparatus suitable for carrying out my new evacuation process; and Fig. 2 shows on a larger scale and in perspective an electrical condenser to the manufacture of which my invention is particularly applicable.

The electrical condenser shown in Fig. 2 comprises essentially a container 3 of metal, or other suitable material, in which are located the condenser units constituted of metal foil, or other conducting material 4, interleaved with paper, or other suitable dielectric material 5, the electrodes of such a condenser being connected in the well understood manner to the contact posts 6, 7. The condenser casing is provided with one or more orifices 8, 9 through which the interior of the condenser may be exhausted, oil admitted thereto, or other desirable operations may be carried out, these orifices being sealed after the manufacture of the condenser is completed.

In carrying out the exhaust of a device of which the one in Fig. 2 is an example, the articles to be exhausted are placed in a receptacle 10 provided with a removable cover 11 and provided with heating means, such for example as the electrical resistance heater 12. This heater preferably is located between the inner and outer walls of the container as shown in the drawing. Three condenser units 13, 14 and 15 are illustrated in the drawing as being placed in the receptacle 10 but of course their number will be governed by their relative size.

A vacuum pump 16 communicates with the interior of the receptacle through a conduit 17 which is provided with a valve 18. An apparatus for furnishing dry air, or other suitable gas, also communicates with the interior of the receptacle 10 through a conduit 19 provided with a valve 20. This apparatus is illustrated in the drawing as consisting of pump 21 and a supply line 22 in which is located refrigerating unit 23 and a chemical drier 24. A gasometer 27 may be provided to store a supply of dry gas. The receptacle containing the devices 13, 14 and 15 is heated within the range of about 85° to 115° C. After having subjected the devices to this temperature for about ½ hour a vacuum is produced within the space containing the same. In the case of electrical condensers of the form shown in Fig. 2 the orifices 8 and 9 are open. The vacuum pump should be operated so as to remove a substantial part of the gas. The gaseous pressure within the space around the condensers preferably is reduced to about one millimeter of mercury. The vacuum pump is maintained in operation for about ½ hour or longer depending on conditions. The valve 18 is then closed and the valve 20 is opened admitting dry air, carbon dioxide, or other desired gas, into the interior of the receptacle 10. The dry gas may be admitted until substantially atmospheric pressure has been produced within the receptacle 10 but it is not essential that any particular pressure should be built up within the receptacle and atmospheric pressure is chosen merely for convenience. The heating is continued for about ½ hour or longer, after the gas has been admitted to the receptacle, thereby causing an equilibrium to be established between the moisture content of the condensers or other articles and the gas within the receptacle.

The valve 20 is again closed after this time has elapsed, and the gas within the receptacle is exhausted by opening the valve 18 and starting the vacuum pump 16 into operation. This procedure, of alternate admission and exhaust of gas, is repeated until substantially no more moisture can be removed in this manner from the articles within the receptacle. Ordinarily complete drying requires about 10 to 15 applications of dry gas followed by the exhaust of the gas to a vacuum of the order of a few millimeters of mercury pressure, which results in a substantially complete removal of the gas and the moisture abstracted by it.

It is not necessary that the gas pressure should be reduced to this very low value during the exhaust interval of the cycle, but of course the process must be continued for a greater number of cycles if any substantial amount of the gas (with its moisture content) remains behind in the receptacle at the close of the exhaust period. In fact, my process could be carried out by admitting a dry gas at a super-atmosphere pressure and then opening the container to reduce the pressure to atmospheric pressure, but the process is more efficient if a substantial part of the gas is exhausted to produce a vacuum as above described.

Although my invention has been described as being particularly applicable to a condenser having cellulosic insulation, it is also applicable to other forms of insulation and to the exhaust of other electrical devices, for example, transformers, or any object in which an extremely dry condition is desired.

When in the above described manner the moisture content of the devices being treated is successively reduced by the repeated application of a gas which is dry with respect to such devices, then the devices preferably are finally impregnated with oil or wax, which excludes moisture during their operation. For example, as shown in the drawing, the valve 25 and the conduit 26 may be opened to admit melted wax or oil, preferably when a vacuum has been produced within the condensers or other articles. The orifices 8, 9 finally are sealed. The devices then are ready for service.

What I claim as new and desire to secure by Letters Patent of the United States is:

1. The process of drying an object having a porous structure which consists in successively reducing the moisture content thereof by the repeated introduction and removal at an elevated temperature of a medium into the interstices of said object which has a greater affinity for moisture than said object, the residual pressure upon each removal of said medium being reduced to a vacuum of the order of a few millimeters of mercury.

2. The process of treating an electrical device containing cellulosic insulation having interstices remote from the exterior which consists in heating said material to an elevated temperature, alternately admitting and removing a gas from the interstices of said material, said gas when admitted being dry with respect to said insulation, the residual pressure upon the removal of said gas being reduced to a pressure materially below atmospheric pressure, and while said insulation is dry introducing a moisture-excluding agent therein.

3. The process of removing moisture from an object having interstitial spaces remote from the exterior which consists in subjecting said object in an enclosed space to an elevated temperature, exhausting the gas which is originally present in said enclosed space, removing moisture from air to render the same dry with respect to the object being treated, admitting and exhausting successive portions of said dried air, the exhaust steps being substantially complete thereby successively carrying away moisture until a desired dry condition has been produced.

4. The process of drying a condenser preliminary to impregnation with a liquid insulating medium which consists in subjecting said condenser at an elevated temperature in an enclosed space to repeated and alternate application and exhaust to a residual pressure as low as a few millimeters of mercury of a gas of greater moisture affinity than said condenser.

5. The method of preparing a condenser preliminary to impregnation with an insulating medium which consists in subjecting said condenser, the casing of which is provided with restricted orifices which are capable of being sealed after impregnation, to the repeated application of a dry gas, each such application being followed respectively by the exhaustion of said gas to a pressure of the order of a few millimeters of mercury, and heating said condenser during such treatment to a temperature of about 85 to 115° C.

6. The method of preparing a condenser preliminary to the impregnation thereof with a liquid dielectric material which consists in placing said condenser in an enclosed space and repeatedly and consecutively admitting to and exhausting from said space a gas of such low moisture content that moisture is abstracted thereby from said condenser and between such applications of gas exhausting to a pressure of the order of a few millimeters of mercury.

7. The process of treating a condenser which consists in successively reducing the moisture content of said condenser by repeated application and removal of a medium which is dry with respect to the dielectric of said condenser, and thereafter impregnating said condenser with a moisture-excluding agent.

8. The process of treating an electrical device which consists in subjecting said device for about one-half hour in an enclosed space at a temperature of about 85° to 115° C. to a dry gas, removing a substantial part of said gas, continuing the heating for about one-half hour at the consequent lower pressure, repeating said treatments about ten to fifteen times to successively reduce the moisture content of said device, and finally impregnating said device with a moisture excluding agent.

In witness whereof, I have hereunto set my hand this 1st day of March, 1929.

FRANK M. CLARK.